United States Patent
Chapman

(10) Patent No.: US 10,288,459 B2
(45) Date of Patent: May 14, 2019

(54) CHANGEABLE COMPASS COLOURS FOR IMPROVED VIEWING

(71) Applicant: Paul Chapman, Taroona (AU)

(72) Inventor: Paul Chapman, Taroona (AU)

( * ) Notice: Subject to any disclaimer, the term of this patent is extended or adjusted under 35 U.S.C. 154(b) by 131 days.

(21) Appl. No.: 15/511,692

(22) PCT Filed: Sep. 15, 2015

(86) PCT No.: PCT/AU2015/050551
§ 371 (c)(1),
(2) Date: Mar. 16, 2017

(87) PCT Pub. No.: WO2016/041012
PCT Pub. Date: Mar. 24, 2016

(65) Prior Publication Data
US 2017/0284838 A1     Oct. 5, 2017

(30) Foreign Application Priority Data

Sep. 16, 2014  (AU) ................ 2014903692

(51) Int. Cl.
*G01D 7/00* (2006.01)
*G01D 13/28* (2006.01)
*G01D 11/28* (2006.01)
*G01C 17/04* (2006.01)

(52) U.S. Cl.
CPC ............. *G01D 13/28* (2013.01); *G01C 17/04* (2013.01); *G01D 7/005* (2013.01); *G01D 11/28* (2013.01)

(58) Field of Classification Search
CPC ........ G01C 17/04; G01C 17/14; G01C 17/18; G01C 17/20; G01D 11/28; G01D 13/28; G01D 7/005

USPC ............................................. 33/348
See application file for complete search history.

(56) References Cited

U.S. PATENT DOCUMENTS

| | | | | |
|---|---|---|---|---|
| 2,600,644 A | * | 6/1952 | Hand | G01D 11/28 250/463.1 |
| 3,673,706 A | * | 7/1972 | Cavalucci | G01C 17/00 434/186 |
| 3,678,591 A | * | 7/1972 | Selig, Jr. | G01C 17/00 33/263 |
| 3,824,947 A | * | 7/1974 | Honkaranta | G01C 21/203 116/302 |
| 3,871,108 A | * | 3/1975 | Beaudout | G01C 17/00 33/349 |
| 4,149,410 A | * | 4/1979 | Lonnroth | G01C 21/203 116/DIG. 43 |

(Continued)

FOREIGN PATENT DOCUMENTS

EP     0301439     12/1994

OTHER PUBLICATIONS

International Search Report for PCT/AU2015/050551, Completed by the Australian Patent Office dated Nov. 6, 2015, 4 Pages.

*Primary Examiner* — Yaritza Guadalupe-McCall
(74) *Attorney, Agent, or Firm* — Brooks Kushman P.C.

(57) ABSTRACT

A lighting and color scheme for instruments to allow an apparent color change of indicia and background between daylight viewing and night-time viewing when an instrument light is turned on. White indicia on a red background is conspicuous in daytime, but can be transformed to green indicia on black background when the instrument is illuminated with a green LED for night-time viewing.

12 Claims, 1 Drawing Sheet

(56) References Cited

U.S. PATENT DOCUMENTS

| | | | | |
|---|---|---|---|---|
| 6,049,989 A * | 4/2000 | Lee | ............ | G01C 17/18 33/318 |
| 6,286,220 B1 * | 9/2001 | Harrison | ............ | G01C 17/26 33/1 PT |
| 6,701,631 B1 * | 3/2004 | Monteiro | ............ | G01C 17/00 33/1 E |
| 7,172,302 B1 * | 2/2007 | Dittus | ............ | G01D 11/28 116/288 |
| 2007/0193045 A1 * | 8/2007 | Kahil | ............ | G01C 17/20 33/355 R |
| 2013/0014397 A1 * | 1/2013 | Iden | ............ | G01C 17/20 33/355 R |
| 2015/0377620 A1 * | 12/2015 | Heerschap | ............ | G01C 9/26 33/301 |
| 2017/0284838 A1 * | 10/2017 | Chapman | ............ | G01D 11/28 |

\* cited by examiner

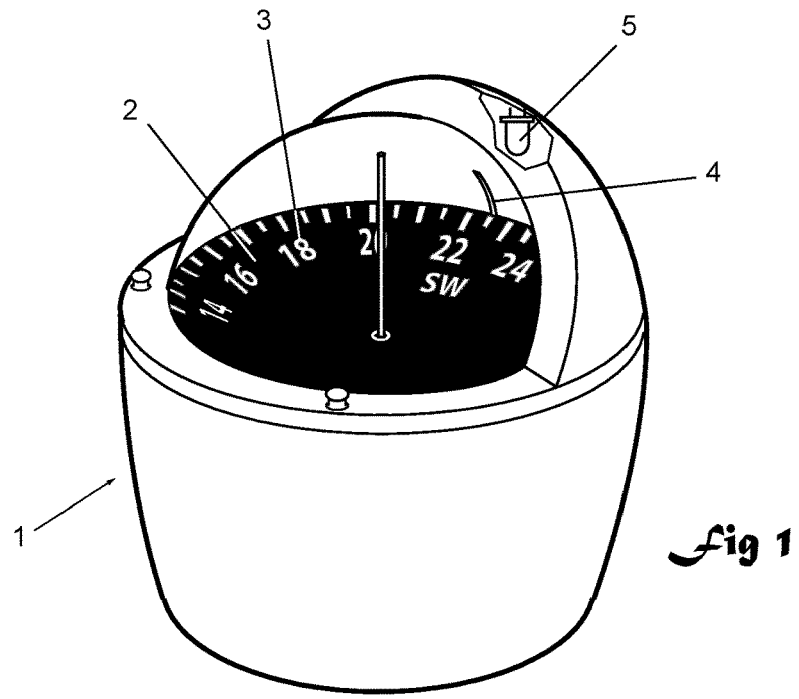
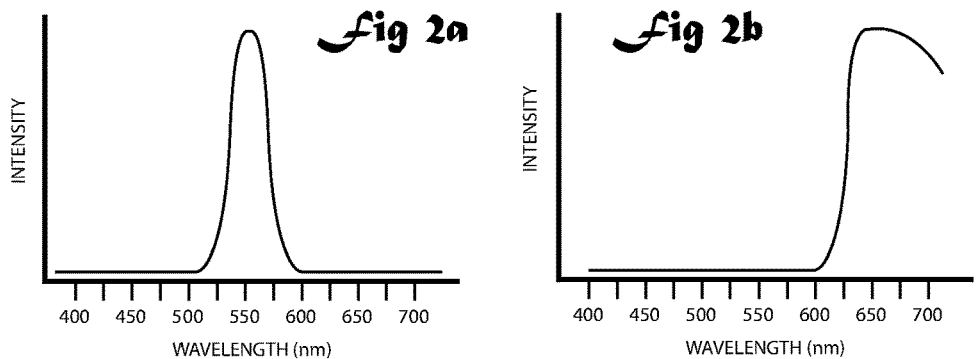
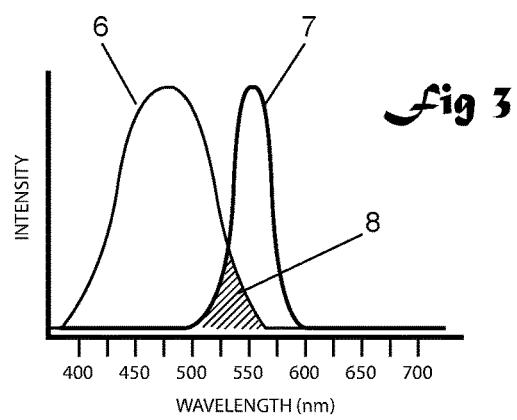

CHANGEABLE COMPASS COLOURS FOR IMPROVED VIEWING

CROSS-REFERENCE TO RELATED APPLICATION

This application is the U.S. national phase of PCT Application No. PCT/AU2015/050551 filed on Sep. 15, 2015, which claims priority to AU Patent Application No. 2014903692 filed on Sep. 16, 2014, the disclosures of which are incorporated in their entirety by reference herein.

TECHNICAL FIELD

This invention relates to magnetic compasses and in particular enhancing their visibility when viewed in either both light and dark ambient conditions, such as might be found in cockpits of planes or marine vessels.

BACKGROUND

For optimum visibility strong contrast is employed between the lettering or indicia and background on a magnetic compass. Using white indicia on black is a common combination as is typical with automotive dials, or the reverse with black indicia on a white background. In dark environments such instruments are illuminated with white light from either an incandescent bulb or a light emitting diode (LED). Using colour has also been found to be effective in producing even better contrast. A combination of red and white is common and employed with important road signs such as stop signs with white lettering on a red background and also important safety labels (such as firehose cabinets). However where levels of illumination are low the physiology of the eye makes other colour combinations easier to read. For example it has been found that green and black offers a highly visible combination in dark environments.

It is desirable to have instruments that can offer different colour combinations depending on whether it is night or day. Hitherto this has not been achieved with for example coloured indicia illuminated with white light or black and white indicia illuminated with coloured light.

SUMMARY

The objective of this invention is to provide a means to change the apparent colour combination of a magnetic compass by using specific colours suitable for daylight illumination, while including narrow wavelength band illumination for night time use, such that the combination of at least one of the colours and the illumination wavelengths results in a substantially dark or black appearance.

The invention can thus be said to reside in a magnetic compass having indicia and background having at least two contrasting colours and a lighting element for nocturnal use, characterised by indicia in a first colour and a background in a second colour that has a reflective spectrum that features a band of substantially total absorption, said lighting element has an emission spectrum with one or more peaks which fall within the absorption band of the second colour and is within the reflective spectral bands of the first colour.

BRIEF DESCRIPTION OF THE DRAWINGS

The invention may be better understood by a description of a preferred embodiment by way of example with reference to the accompanying drawings in which:

FIG. 1 shows a magnetic compass and lighting element;
FIG. 2a shows the emission spectrum of a green LED;
FIG. 2b shows the reflection spectrum of a red ink;
FIG. 3 shows the reflection spectrum of a blue paint, with an overlay of the LED emission spectrum.

DETAILED DESCRIPTION

Referring to FIG. 1 a magnetic compass 1 has card surface 2 with indicia 3 and a pointer 4. The card surface 2 has a background colour of red, while the indicia representing numerals and lines is white. The pointer is coloured blue. With normal daylight or white-light illumination the display provides an easily readable and contrasting magnetic compass.

An LED 5 illuminates the magnetic compass, the LED is chosen having an output colour of green. In darkened ambient light, power is delivered to the LED illuminating the card, indicia and pointer of the magnetic compass.

Clearly the white indicia will appear green, while the red will appear black, and the blue can appear bluey-green depending on the spectral characteristics of the LED and pointer. Understanding the optical interaction between the surfaces can be better appreciated with reference to FIGS. 2a and 2b.

FIG. 2a shows the emission spectrum of a green LED which shows a peak at 550 nm with a span extending from 500 to 600 nm. A surface with a reflective spectrum having features limited to beyond these extremes will return no reflection from illumination by the LED and appear black. FIG. 2b shows a reflective spectrum of a red surface showing the onset of refection at 620 nm extending into the deep red.

FIG. 3 shows a reflective spectrum 6 of a blue surface with a cut off at 520 nm, whereas spectrum 7 shows the emission spectrum of a green LED. The shaded area 8 shows the overlap between the two spectra and represent the apparent colour of the surface under illumination by the green LED, which in this instance will be a greenish-blue with a central wavelength centred on 510 nm.

It will be apparent from the above description that the appearance of the magnetic compasses will be quite different depending on whether the ambient light is white or whether the illumination is being achieved by the LED in a dark situation. The application of the invention provides cockpits and ship bridges with greater flexibility to make magnetic compasses which are more visible to users both day and night.

The coloured surfaces may be produced by one of a multitude of means such as paint, pigmented inks or pigmented plastics. The use of fluorescent materials may also be used to advantage where one or more LEDs emit light in wavelengths below about 420 nm. The lighting may also include a primarily white light source with a suitable filter. While the described embodiment involves a green LED and red surface to produce black, it will be clear to those in the art that red LEDs may be used and a blue or green surface used in combination with white, so under illumination by the LED the blue and green surfaces become black while the white surface appears red.

Other aspects of the invention like the disposition of the LEDs, methods of applying colour to a gauge do not perform part of the invention and will be rudimentary to those familiar with the art.

The invention claimed is:

1. A magnetic compass comprising:
   a dial having a surface with indicia and background, the indicia and the background having at least two contrasting opaque colours, and
   a lighting element spaced from and adjacent to the dial for nocturnal use;
   wherein the indicia is a first colour and the background is a second colour that has a reflective spectrum that features a band of substantially total absorption, said lighting element having an emission spectrum with one or more peaks which fall within the absorption band of the second colour and is within the reflective spectral bands of the first colour.

2. The magnetic compass as in claim 1, wherein the first colour is white, the second colour is red and the lighting element is an LED having a green or blue colour.

3. The magnetic compass as in claim 2 wherein the indicia is white on a red background.

4. A magnetic compass comprising:
   a dial and a pointer which rotate relative to one another, the dial having indicia of a first opaque colour and a background having contrasting second opaque colour when viewed in daylight, the second opaque colour having a reflective spectrum that features a band of substantially total absorption, and
   a lighting element spaced from and adjacent to the dial for use in low daylight conditions, the lighting element having a limited colour spectrum falling substantially within a band of substantially total absorption of the dial and which is within the reflective spectral band of the first colour,
   wherein, when the dial is illuminated by the lighting element, the indicia reflects light and are visible while the background absorbs light and appears to be black.

5. The magnetic compass of claim 4, wherein the pointer has a opaque colour which falls within the limited colour spectrum of the lighting element having.

6. The magnetic compass of claim 4, wherein the pointer has a opaque colour which contrasts with the a first opaque colour of the dial.

7. The magnetic compass of claim 4, wherein the lighting element emits a green colour spectrum.

8. The magnetic compass of claim 4, wherein the first opaque colour is white.

9. The magnetic compass of claim 4, wherein the second opaque colour is red.

10. The magnetic compass of claim 4, wherein the pointer is blue.

11. The magnetic compass of claim 4, wherein the lighting element is a LED which emits a green colour spectrum and the second opaque colour of the dial is red.

12. The magnetic compass of claim 4, wherein the lighting element is a LED which emits a red colour spectrum and the second opaque colour of the dial is green or blue.

* * * * *